United States Patent
Rodriguez

(10) Patent No.: US 6,351,525 B1
(45) Date of Patent: Feb. 26, 2002

(54) METHOD AND APPARATUS FOR CONSERVATION OF SWITCHING EXCHANGE RESOURCES

(75) Inventor: Juan Gilberto Rodriguez, Coahuila (MX)

(73) Assignee: Telefonaktiebolaget L M Ericsson (publ) (SE)

(*) Notice: Subject to any disclaimer, the term of this patent is extended or adjusted under 35 U.S.C. 154(b) by 0 days.

(21) Appl. No.: 09/158,043

(22) Filed: Sep. 22, 1998

(51) Int. Cl.⁷ ............................................. H04M 15/00
(52) U.S. Cl. .......................... 379/112.04; 379/112.01; 379/112.03; 379/112.05; 379/133; 379/139; 379/221.03
(58) Field of Search ................................ 379/114, 112, 379/113, 133, 134, 137, 138, 139, 112.01, 112.03, 112.04, 112.05, 112.1, 220.01, 221.03, 221.06, 221.07

(56) References Cited

U.S. PATENT DOCUMENTS

| | | | |
|---|---|---|---|
| 4,192,973 A | * 3/1980 | Williams et al. | 379/139 |
| 4,387,456 A | 6/1983 | Creteau | 370/13 |
| 4,613,729 A | * 9/1986 | Daisenberger | 379/139 |
| 4,748,657 A | 5/1988 | Rudd et al. | 379/189 |
| 5,291,552 A | * 3/1994 | Kerrigan et al. | 379/266 |
| 5,574,770 A | * 11/1996 | Yoo et al. | 379/34 |
| 5,606,593 A | * 2/1997 | Smith | 379/33 |
| 5,615,255 A | * 3/1997 | Lemieux | 379/220 |
| 5,778,057 A | * 7/1998 | Atai | 379/220 |
| 5,822,420 A | * 10/1998 | Bolon et al. | 379/230 |
| 5,905,785 A | * 5/1999 | Dunn et al. | 379/113 |
| 5,933,481 A | * 8/1999 | MacDonald | 379/137 |
| 5,946,375 A | * 8/1999 | Pattison et al. | 379/34 |
| 5,949,862 A | * 9/1999 | Fukuzawa et al. | 379/113 |
| 6,011,838 A | * 1/2000 | Cox | 379/113 |

FOREIGN PATENT DOCUMENTS

| | | | |
|---|---|---|---|
| CA | 1182231 | 2/1985 | |
| CA | 2076518 | 5/1993 | |
| DE | 3623534 A1 | 1/1988 | |
| WO | WO 96/07282 | 3/1996 | H04Q/3/545 |
| WO | WO 97/00585 | 1/1997 | |

OTHER PUBLICATIONS

Newton, Harry Newton's Telecom Dictionary, Miller Freeman Inc. 15th Edition, pp. 588–589, Feb. 1999.*

* cited by examiner

Primary Examiner—Huyen Le
Assistant Examiner—Quoc D. Tran
(74) Attorney, Agent, or Firm—Jenkens & Gilchrist, P.C.

(57) ABSTRACT

An apparatus which provides for the management of high telecommunications traffic volume within a switching exchange, or between exchanges, includes a timer, which measures switching exchange resource use time, and a timer reduction unit, which is used to intelligently adjust the value of the timer responsive to predetermined conditions, which can be switching exchange loading conditions, such as a number of calls simultaneously active or a number of occupied resources; a timing condition, such as the time of day; or an event, such as connection pathway repairs, a remote exchange loading condition, remote timing condition, or other activity. The invention includes a method of operating a switching exchange which includes sensing an existing condition within the exchange and comparing it to a predetermined condition, and reducing the time-out value of a timer within the exchange if the existing condition and predetermined condition are equivalent. The method and apparatus of the invention may also be implemented within a private branch exchange.

22 Claims, 5 Drawing Sheets

METHOD AND APPARATUS FOR CONSERVATION OF SWITCHING EXCHANGE RESOURCES

BACKGROUND OF THE INVENTION

1. Technical Field

This invention relates generally to telecommunications switching systems, and more particularly, to an apparatus and method for managing switching exchange resources.

2. History of Related Art

Telephony, like the mails, provides individual, person-to-person communication. The overall circuit between one subscriber and another may change from call to call. Switching exchanges make possible the rapid and drastic reconfiguration of the transmission path that constitutes the telephone connection network. During periods of average usage, telephone exchanges are not utilized at anywhere near their full capacity. However, during times of high traffic volume, or peak times, the number of resources available in any particular exchange is dramatically reduced, and idle resources may be non-existent.

Ongoing, or completed, calls are not the only system activity which occupies exchange resources. Any time a call is placed, there must be some partial occupation of system resources until the call is completed. The time required to place a call is divided up into three periods: (1) that time occupied by the dial tone (i.e. the dial tone delay), (2) that time occupied by dialing (i.e. the dialing delay), and (3) that time occupied by the ring tone (i.e. the ring tone delay). Such call placement activities and other, less usual, events (e.g. forgotten links which are left connected for longer than a few hours) may account for significant occupation of system resources. In addition, some system delays, such as busy signals and off-hook conditions, occupy exchange resources and never result in call completion.

While safeguard timers have been built into exchange switches to time-out under various circumstances, during periods of high traffic volume such constraints may be inadequate to produce the most efficient use of switching resources. For example, it is quite common for a subscriber to leave the phone in an off-hook condition, where it remains producing a dial tone until the related timer within the exchange switch expires (i.e. times-out). Similarly, when a subscriber attempts to call another who is absent or does not answer the phone, the ring tone is often asserted for much longer than necessary. Common time-out delays within exchange switches are forty five seconds for the dial-tone and ninety seconds for the ring tone. It is not until the respective timers in the exchange switch time-out that associated system resources are freed and made available for other subscribers. These timers, which operate within the exchange switch, also fail to react to changing load conditions and call placement activities which seize system resources for extended time periods.

One approach to solving a portion of this problem utilizes an electronic circuit capable of releasing a channel and trunk in a telephone central office by inserting an additional timer between the telephone and the central office. The timer senses the commencement of the dial tone and opens the tip or ring lead whenever an off-hook condition persists for more than about fifteen seconds without the commencement of any dialing activity. However, this limited approach is not sensitive to loading conditions within the exchange switch and only operates to minimize a single resource-consuming activity which can occur during call placement.

A method and apparatus capable of monitoring the loading conditions within an exchange switch is needed so as to actively adjust the time-out safeguards applied to call placement activities, and other activities, as mentioned previously, so as to more efficiently utilize switching resources. Further, it is at times desirable to manage switching resources in a proactive or anticipatory fashion, rather than in a reactive fashion. That is, some periods of high traffic volume are completely predictable (e.g. business hours and holidays); such peak periods can be anticipated and better-accommodated by adjusting the time-out safeguards built into the exchange switch. New timers may also be introduced into switching exchanges for further efficiency. Finally, it is also desirable to provide switching exchange management in a completely uncoordinated and independent fashion, so as to accommodate switching equipment from different manufacturers without regard to specific protocols or signaling. It is also desirable to provide coordinated switching for circumstances involving unified network signaling protocols which can be adapted to provide loading information and time-out period adjustment along the entire length of each call signal path.

SUMMARY OF THE INVENTION

The invention basically comprises a timer and a timer reduction unit within a switching exchange which adjust measured time-out values and thus control switching exchange resource availability in an intelligent fashion. For example, the timer within the exchange may be set to measure a predetermined usage time for an exchange resource. Such timers include a dial tone timer, a dialing timer, a ring tone timer, or a busy signal timer. When a predetermined condition is detected, the timer reduction unit may act to reduce the measured predetermined usage time for the switching exchange resource, causing a time-out to occur sooner. This reduction may be by a percentage amount or by a predetermined amount of time, such as a fixed number of seconds.

The predetermined condition may be a loading condition, such as the number of occupied switch resources, the number of calls active within the exchange, the number of calls occurring within a predetermined amount of time, or the number of active ports or switches. The predetermined condition may also be a timing condition, such as the time of day, or the date. Finally, the predetermined condition may be an event, such as the occurrence of repairs at a particular exchange, or the installation of a new exchange.

In accord with another aspect of the invention, the timer and timer reduction unit may also exist within a Private Branch Exchange (PBX). The predetermined conditions applicable to a switching exchange also apply to implementation of the invention within a PBX.

In accord with another aspect of the present invention, a telecommunications system may comprise a first and second switching exchange connected by a communications link. Upon detection of a predetermined condition by the second exchange, a signal may be sent from the second exchange to the first exchange so as to reduce the predetermined usage time of a timer in the first exchange. Again, the predetermined condition at the second exchange which triggers a response by the timer reduction unit in the first exchange may be implemented as described above. Of course, the second switching exchange may also act to reduce an internal timer predetermined usage time, and relay a message to other exchanges along the call connection path so as to communicate the fact that the call may be dropped by the second exchange before active timers in the other connected exchanges have timed-out.

Finally, the invention embodies a method of operating a switching exchange comprising the steps of: sensing an existing condition, such as an existing loading condition, timing condition, or event; comparing the existing condition with a predetermined condition; and then reducing the value of the predetermined usage time for a switching exchange resource timer if the existing condition is equal to the predetermined condition value. For example, if the predetermined condition is a loading condition, such as 90% occupation of switching matrix ports, and 90% of the ports are actually occupied as the existing condition, then the ring tone timer within the exchange may have its value reduced from 90 seconds to 75 seconds. All of the discussion above with respect to the variety of predetermined conditions applies with equal force to the method of the invention.

BRIEF DESCRIPTION OF THE DRAWINGS

A more complete understanding of the structure and operation of the present invention may be had by reference to the following detailed description when taken in conjunction with the accompanying drawings, wherein.

DETAILED DESCRIPTION OF PRESENTLY PREFERRED EXEMPLARY EMBODIMENTS

Figure 1:
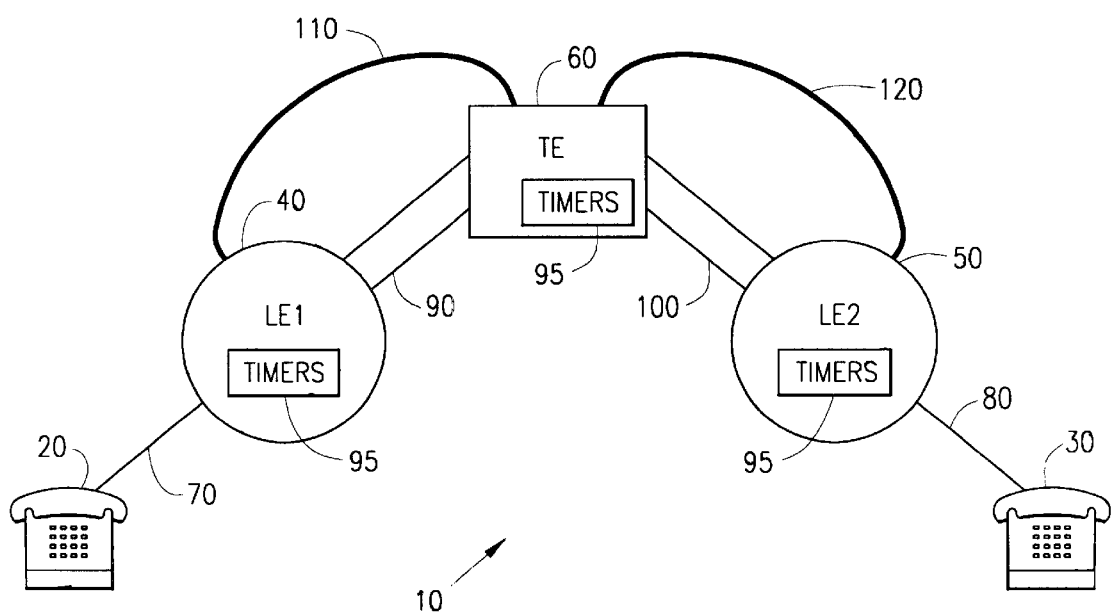
FIG. 1 is a block diagram of a telecommunications network.

The apparatus and method of the present invention can be more clearly understood by referring to FIG. 1, wherein a block diagram of a telecommunications network 10 is illustrated. The telephone call completion process typically operates as follows:

The receiver of the calling phone 20 is removed so as to place the calling phone 20 in the off-hook position. The origination or calling subscriber loop 70, which was open before the receiver was removed, is now closed and an electrical connection is completed between the calling phone 20 and the local switching exchange (LE1) 40. A dial tone is returned to the receiver of the calling phone 20 by the LE1 40, and a series of switching exchange timers 95 are activated.

A switching exchange or PBX may contain several exchange resource timers which have been set to measure a predetermined usage time. Several examples of these timers can be seen in FIG. 2, such as the dial tone timer 212 (used to measure the length of the time after the telephone receiver is taken off-hook and dialing activity commences), the dialing timer 214 (used to measure the time from the beginning of dialing activity until a complete telephone number has been entered), a ring timer 216 (used to measure the time from the first ring tone at the called number until the called telephone is placed off-hook), and the busy timer 218 (used to measure the time that a busy signal is asserted, until the calling phone is placed on-hook). The dynamic timers 210, which comprise the dial tone timer 212, dialing timer 214, ring timer 216, and busy timer 218, are equivalent to or identical to, the switching exchange timers 95 shown in FIG. 1.

To illustrate the interaction between the various timers and the timer reduction unit (TRU) 200 of FIG. 2, the rest of the call completion sequence will now be described. The first timer to be activated when the calling phone 20 is placed in the off-hook position is the dial tone timer 212 within the LE1 40, which measures the length of time the dial tone is active, and indirectly, the time that LE1 40 resources, such as code receivers and tone generators which are assigned to the port for the calling phone 20, are allocated. If no dialing activity occurs, then the dial tone timer 212 will time-out according to its assigned predetermined usage time. A tone will be applied to the subscriber loop 70 to indicate the off-hook error and the call will eventually be dropped by the LE1 40.

If dialing activity is initiated, then one or more memory registers (not shown) within the LE1 40 will be assigned to acquire the called number, and each digit entered by the calling party will be stored. As soon as dialing activity commences, the dial tone timer 212 is reset, and the dialing timer 214 within the LE1 40 is activated, and all digits required to form a complete called number must be entered before the predetermined usage time for dialing activity expires. If the calling party fails to enter a complete and/or correct telephone number, the dialing timer 214 will time-out and a tone generator will be activated to apply an error tone to the subscriber loop 70. Thereafter, the LE1 40 will drop the call. However, if the dialing activity is completed successfully by the user before time-out, usually within approximately 45 seconds, the dialing timer 214 will be reset, and various control signals will flow over the origination signal link 110, commonly utilizing the Signaling System 7 (SS7) protocol, to make the origination trunk 90 connection between the LE1 40 and the tandem exchange 60. Of course, FIG. 1 is for illustration purposes only, and there are many other possible connections that can be made out of the LE1 40 so as to complete the telephone call connection.

Figure 2:
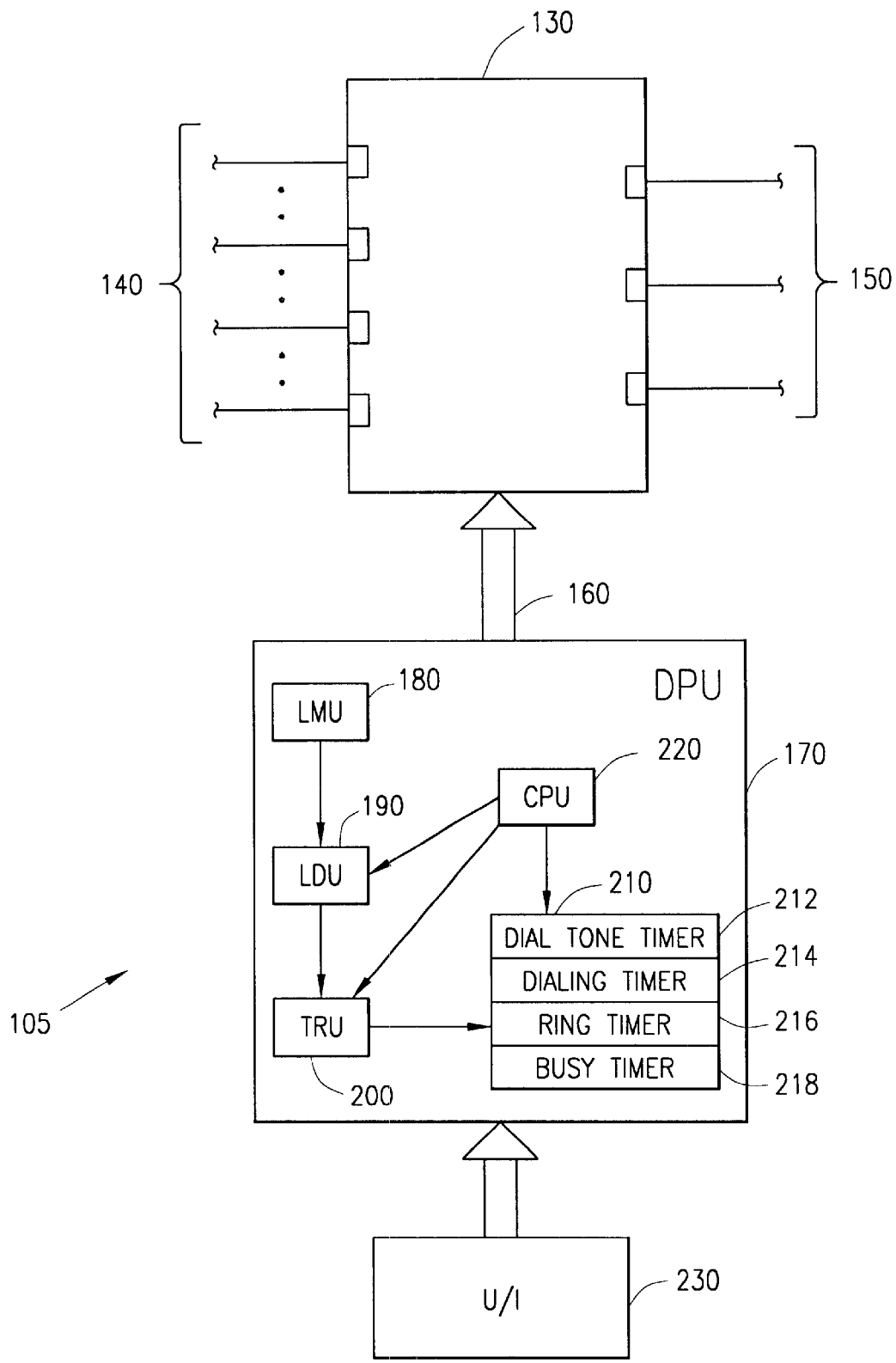
FIG. 2 is a block diagram of a local exchange switch.

The tandem exchange 60 also contains a set of switching exchange timers 95 (equivalent to, or identical to the set of dynamic timers 210 shown in FIG. 2) which are used to enable resource allocation within the tandem exchange 60. As the call information is routed through the switching data channels, such as destination signal link 120, the destination local exchange (LE2) 50 tests the destination subscriber loop 80 and the called phone 30 for availability. If the called phone 30 is busy, the LE1 40 applies a busy tone signal to the calling subscriber loop 70, and the busy timer 218 within the LE1 40 is started and counts down for a predetermined usage time, until the calling party places the phone on-hook, or the end of the predetermined usage time is reached. If a busy signal is asserted, there is no chance whatever of the called party answering the call, thereby wasting an increased number of resources throughout the connection path for every second that the calling party maintains the connection. If the busy timer 218 is allowed to time-out, then the call will be dropped by the LE2 50, the tandem exchange 60, and the LE1 40.

If the subscriber loop 80 connection is not busy, then the call can be completed by establishing the destination trunk 100, ringing the called phone 30 with the LE2 50, and waiting for the called party to place the called phone 30 off-hook. Once the ring tone is activated, the ring timer 216 located in LE2 50 will be started, and unless the called party places the called phone 30 off-hook within the predetermined usage time for ringing activity, the ring timer 216 will time-out and the call will be dropped by the LE2 50, the tandem exchange 60, and the LE1 40. However, until the called phone 30 is taken off-hook, all of the switching exchanges, in this case the LE1 40, tandem exchange 60, and the LE2 50, must devote resources to the connection, even though there may be no possibility of completing the call. Further, the most valuable resources in the connection path, the origination and destination trunks 90 and 100, respectively, are also occupied.

Turning now to FIG. 2, a more detailed block diagram of a typical switching exchange 105 can be seen. The switch matrix 130, which makes the connections between the subscriber side 140 and the trunk side 150 of the switching exchange 105 is controlled by various elements within a distributed processing unit (DPU) 170 by way of the switch control lines 160. The DPU 170 comprises a load measuring unit (LMU) 180, a load detection unit (LDU) 190, a timer reduction unit (TRU) 200, a central processing unit (CPU) 220, and a set of dynamic timers 210. In this illustration, the dynamic timers 210 are shown to further comprise a dial tone timer 212, a dialing timer 214, a ring timer 216, and a busy timer 218. The dynamic timers 210 may further comprise other timers, such as a call connect timer. A user interface 230, which may comprise a keyboard, modem/keyboard combination, or even another computer, is used to interact with the various elements within the DPU 170, including the dynamic timers 210, to modify their operation, as may be desired by the switching exchange service provider.

The LMU 180 exists as a microprocessor, register, memory element, physical counting element, or as any other means for measuring the existing conditions of resource loading, timing, or other events within a telephone switch. For example, the LMU 180 may measure the number of resources currently allocated (normally, the number of switch contacts in use or connected within the matrix) and report this to the LDU 190 on a continuous basis, a periodic basis, or upon request.

When the LDU 190 detects that resource allocation has reached a level considered to be critical (e.g. 90%), or in excess of a predetermined threshold, the LDU 190 will activate the TRU 200 so as to reduce the predetermined usage time measured by one or more of the dynamic timers 210 before a time-out condition may occur. The predetermined condition of criticality (e.g. resource allocation level), as established for the LDU 190, may be set during manufacture of the LDU 190 or the DPU 170, or may be changed at any time by means of the user interface 230. It is the LDU 190 that allows intelligent control of the dynamic timers 210 based on the detection of a predetermined condition. However, as it will be explained below, the TRU 200 may also act independently, based on a scheduled timing condition, to reduce the predetermined usage time of the dynamic timers 210.

While not absolutely necessary to the operation of the present invention, a central processing unit (CPU) 220 will typically control the sequence of operations as they occur between the LDU 190, the TRU 200, and the dynamic timers 210. Of course, even though the various elements within the DPU 170 have been illustrated as separate entities, they can also be completely integrated into a single processing unit or integrated circuit to accomplish the purposes of the present invention.

The present invention may operate in any of several different modes, including: dynamic or independent mode, coordinated mode, and reactive or planned/anticipated mode. In the dynamic or independent mode, the TRU 200 will act independently of any other activity which occurs along the length of the call connection path, except that located in its own switching exchange 105. Connection activity, predetermined conditions, and other events occurring in other switching exchanges are simply ignored. Only predetermined conditions within the exchange 105 containing the dynamic timers 210 are detected and used to generate a reduction in the predetermined usage time of various timers by the timer reduction unit 200. Essentially, only a loading condition, timing condition, or event which occurs at the situs of the switching exchange 105 containing the dynamic timers 210 is capable of causing the timer reduction unit 200 within the exchange 105 to reduce the predetermined usage time for one or more of the dynamic timers 210.

In the coordinated mode, information may be passed along the signal links 110 and 120, or out of the voice information band along the trunks 90 and 100, to relay the occurrence of predetermined conditions which occur in a remote exchange to a local exchange. For example, predetermined time-out conditions which occur within the LE2 50, may be reported to the tandem exchange 60, by way of the destination signal link 120, or the destination trunk 100. In this example, the predetermined condition would be an event condition, such as a time-out condition within the timers 95 of LE2 50. However, it is the predetermined usage time of timers 95 within the tandem exchange 60 which would be reduced.

Another example would include the achievement of a certain number of completed call connections which are simultaneously active within the LE2 50; this loading condition could be transmitted as a message over the destination signal link 120 or the destination trunk 100 to the tandem exchange 60 so as to cause a reduction in the predetermined usage time for one or more of the timers 95 located within the tandem exchange 60. The tandem exchange 60 can be programmed so as to immediately reduce the time-out values of the timers 95 upon receipt of the message from the LE2 50, or the TRU 200 within the tandem exchange 60 may receive the message directly (or via the LDU 190 within the tandem exchange 60) and act to reduce the predetermined usage time for one or more of the timers 95 within the tandem exchange 60.

In each of the previous examples, it is seen that a predetermined condition which is encountered by a remote exchange, and which is communicated to a local exchange, can be used to reduce the predetermined usage time of a timer located in the local exchange. Loading or timing condition messages may be sent between exchanges. Other inter-exchange messages, which constitute event conditions, may include information about time-out value overlap between exchanges, error conditions within exchanges, a predetermined number of time-out events occurring within a remote exchange, etc. These messages may be sent forward through the connection path (i.e. from LE1 40 to tandem exchange 60 and then on to LE2 50), or backward, as has been previously described.

In the reactive mode, the TRU 200 within the local exchange 105 may reduce the time-out period of the dynamic timers 210 based on the detection of a predetermined condition within the exchange 105, such as a loading condition, timing condition, or event. Reactive operation includes the ability to sense the rate of calls connected through the exchange, so that high rates of activity, or activity bursts, can be sensed and accommodated.

Figure 3A:
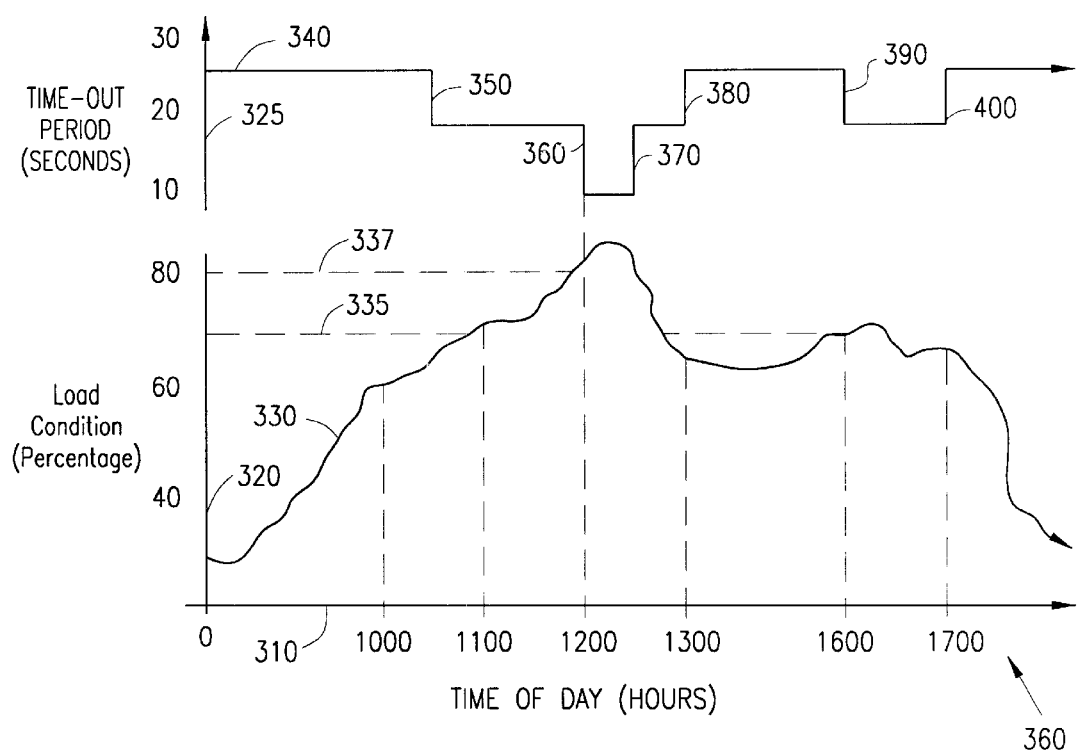
FIG. 3A is a loading condition timer adjustment timing diagram.

Turning now to FIG. 3A, a loading condition timer adjustment timing diagram can be seen. This reactive mode chart 300 operates to further illustrate the reactive mode of operation within a switching exchange 105. The horizontal axis 310 indicates the time of day in hours, while the vertical axis 320, indicates a load condition percentage of occupied resources on the lower scale, and the time-out period for an arbitrary timer within the exchange on the upper axis 325. The existing loading condition 330 represents a continuous reading of the percentage of resource allocation, or loading, within the switching exchange 105 over the course of a day. Critical loading percentages, or predetermined loading conditions, have been arbitrarily assigned at a 70% threshold 335 and an 80% threshold 337. As these loading condition thresholds are crossed by the existing loading condition 330, the predetermined usage time for the timer 340 is reduced; the first reduction in value at event 350 occurs when the 70% threshold 335 is broken at approximately 1030 hours. The second adjustment at event 360, which is more severe than the first adjustment event at 350, occurs when the 80% threshold 337 is broken. Once the loading of the exchange 105 decreases somewhat, as seen herein at about 1230 hours, the predetermined usage value may be allowed to increase by a predetermined amount of time at event 370, and again at event 380 (i.e. at 1300 hours) when the 70% threshold 335 is crossed again. However, when the 70% threshold 335 is again crossed at 1600 hours, a reduction in the predetermined usage time for the timer occurs at event 390 and is maintained until approximately 1630 hours, when the existing condition of loading percentage is reduced below the 70% threshold 335 at event 400.

In the planned/anticipated mode, the TRU 200 within the switching exchange 105 will act to reduce the time-out period of dynamic timers 210 (i.e. the predetermined usage time for a switching exchange resource) according to predetermined conditions, such as timing conditions (e.g. the time of day or date), or other conditions which are known to load down a particular exchange, and can be anticipated before they occur. From the previous discussion, it should be apparent that the present invention can operate in a combination of the independent-reactive modes, independent-planned/anticipated modes, coordinated-reactive modes, or coordinated-planned/anticipated modes. That is, combinations of the above-described modes are included as a part of the instant invention.

Figure 3B:
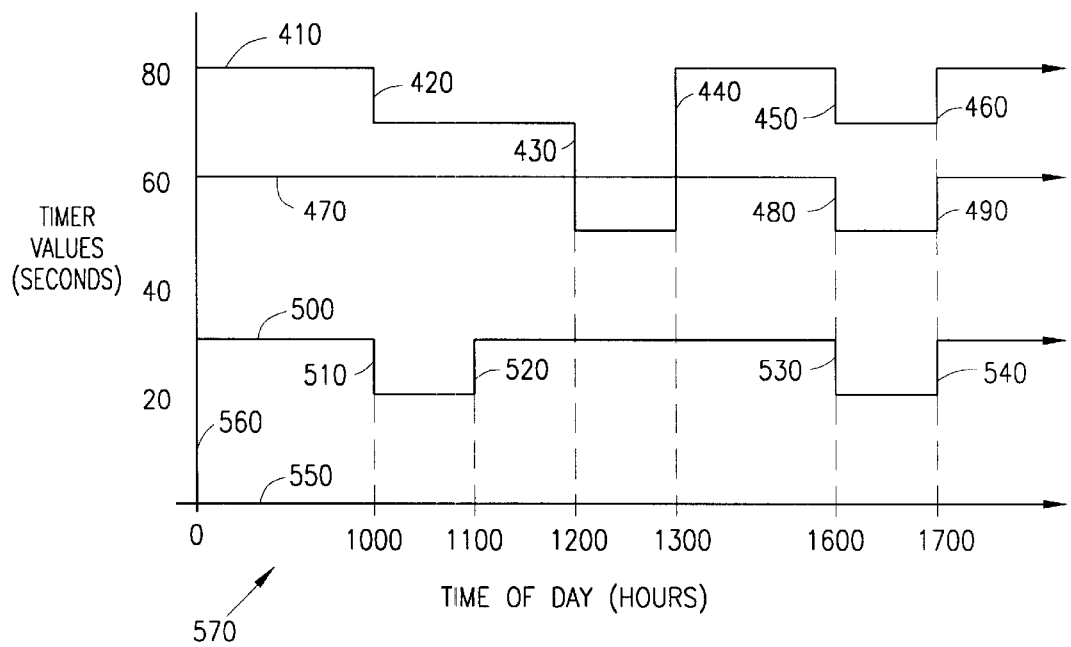
FIG. 3B is a timing condition timer adjustment timing diagram.

A further example of the planned/anticipated mode is illustrated in FIG. 3B, wherein a timing condition timer adjustment timing diagram is shown. The planned/ anticipated mode chart 570 comprises a horizontal axis 550 which is divided up into hours of the day, and a vertical axis 560 which indicates the number of seconds of predetermined usage time assigned to a particular timer. In this example, the timers will be arbitrarily named as Timer A 500, Timer B 470, and Timer C 410. However, these timers are identical to, or equivalent to, any of the dynamic timers 210 which have been previously described.

In the planned/anticipated mode of operation, Timer A 500 may be reduced from a predetermined usage time of 30 seconds to a predetermined usage time of 20 seconds at event 510, which is 1000 hours. That is, in this case, the predetermined condition is a time of day timing condition. Timer C 410, is likewise reduced from a predetermined usage time for an exchange resource of 80 seconds to a value of 70 seconds at event 420, which is also 1000 hours. Timer A 500 is returned to its original predetermined usage time of 30 seconds at event 520, which is 1100 hours. Timer A 500 is not affected by the predetermined timing condition of a time of day until 1600 hours, when both timer A 500 and timer C 410 have their respective predetermined usage times of 30 seconds and 80 seconds reduced by 10 seconds each, respectively, at events 450 and 530. Timers A and C (500 and 410) resume their predetermined usage time values in response to the predetermined condition, which is a timing condition, of 1700 hours at events 540 and 460, respectively. Timer B 470 only has its predetermined usage time value of 60 seconds reduced by the timer reduction unit at event 480, which is a timing condition of 1600 hours. The predetermined usage time is reduced from 60 seconds to 50 seconds, but is readjusted upward to 60 seconds at event 490, which is a timing condition of 1700 hours.

Timer C 410, after the initial reduction in the predetermined usage time of 80 seconds to 70 seconds at event 420, undergoes an additional reduction to a predetermined usage time of 50 seconds at event 430, which is 1200 hours, or mid-day. However, the predetermined usage time for timer C 410 is adjusted upwardly to the original value of 80 seconds at event 440, or 1300 hours.

The amount of reduction in each of the timers is predetermined, and can be varied by an absolute value (e.g.. five seconds, ten seconds, etc.), or in the alternative, the time-out periods may be reduced by an absolute percentage of the initial predetermined usage time or value, or a percentage which depends on the amount of loading or rate of loading (i.e., increase in loading per unit time) encountered by the switching exchange 105. That is, the predetermined usage time may be reduced, responsive to a predetermined condition, such as a loading condition (e.g. number of calls, number of calls occurring within a predetermined amount of time, or number of occupied ports or switches), a timing condition (e.g. time of day or date), or an event (e.g. user interface 230 request, remote exchange repair, new exchange installation, or message from a remote exchange in the connection path regarding resource loading, timing, or event conditions at the remote exchange).

To further clarify the various modes of operation involved in the present invention, it should be understood that independent exchange switch operation allows the interoperability between various brands of equipment which do not communicate using message information and the present invention. That is, if a link protocol, such as SS7, does not accommodate transmission of loading activity information between switching exchanges, then independent operation allows each switching exchange to manage internal traffic without reference to the activity on any other switching exchange involved in a particular call connection. Calls which are incomplete when any particular timer in a connection chain of switching exchanges times-out will simply be dropped across the entire set of exchanges involved. Further, the present invention includes the use of a proprietary protocol which involves checking back along the chain toward the originating subscriber (or forward through the chain to the called party) to ascertain the amount of loading in various exchange switches along the physical connection path to adjust time-out values along the chain to accommodate high traffic volume within the loaded exchange switches. Finally, the method of the present invention may also be used for managing high volume activity in video or other information switches. The method and apparatus of the present invention includes use in any type of switching environment which may become saturated by high traffic volume and where connections are made on a non-dedicated basis.

All invention apparatus elements shown are for illustration purposes; many other equivalent elements may be substituted for those specifically named. For example, the dynamic timers 210, shown to comprise dial tone timer 212, dialing timer 214, ring timer 216, and busy timer 218 may also comprise other timers, such as an overall connection timer or other event timers which operate within the exchange switch 105. For example, a connection timer (not shown) might be programmed by the user interface 230, or as preset during manufacture, to terminate any calls which have been in progress for more than twelve hours. Of course, such timers can also be programmed to be entirely defeated, so that special call connection situations, such as line monitoring and continuous connections, will not be disturbed.

Figure 4:
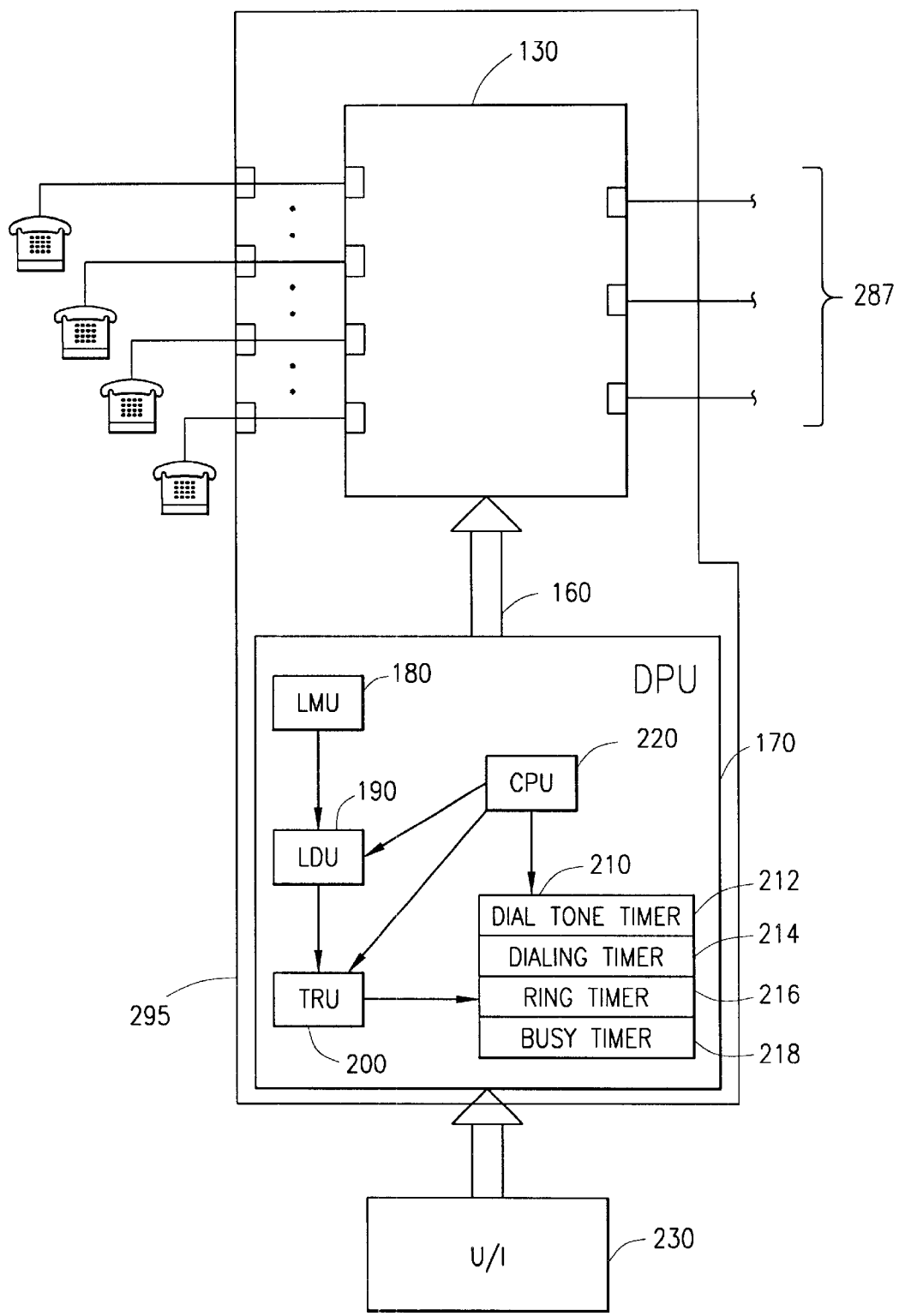
FIG. 4 is a block diagram of a PBX.

The present invention also includes the use of any one, or all, of the dynamic timers 210 shown acting as component elements of a private branch exchange switch (PBX) 295, as shown in FIG. 4. The time periods may be set by the local phone company or manufacturer, or may also be programmed periodically by service technicians on-site via the user interface 230, or alternatively, by the local telephone service provider by way of the local subscriber loop connection lines 287 and a communication means, such as a receiving memory register 298, located within the PBX 295. The implementation of the invention within a PBX 295 would normally not be accomplished as a means of providing an independent-reactive mode apparatus unless the timers within the PBX 295 were adapted for being commanded on an as-needed basis by the local exchange switch to which the PBX 295 was connected. However, the present invention includes an implementation of the invention within a PBX 295 which tracks the time of day and changes time out periods for peak and off-peak conditions. The PBX 295 may also be adapted to query the local exchange switch to determine whether timer values require modification, depending on existing loading conditions within the exchange switch.

Figure 5:
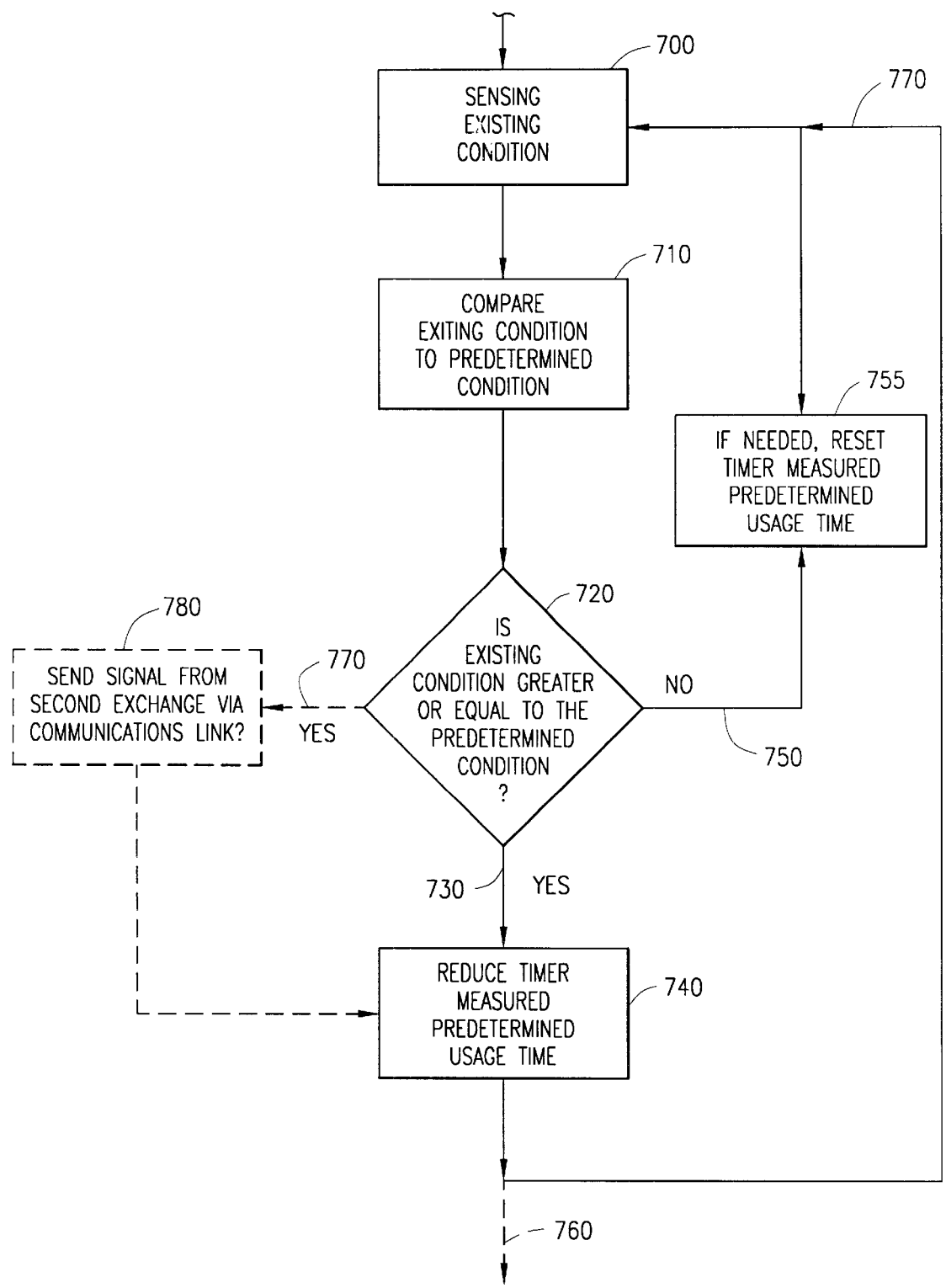
FIG. 5 is a flow chart diagram of inter-exchange operations.

As can be seen in FIG. 5, the present invention also includes a method of operating a switching exchange having a timer for measuring a predetermined usage time for a switching exchange resource, and a timer reduction unit in electronic communication with the timer. The method comprises sensing an existing condition at step 700, which is essentially the existing or active state of conditions within the exchange, such as loading, timing, or events. An example includes sensing the existing loading condition 330 illustrated in FIG. 3A. The sensed existing condition is compared with a predetermined condition at step 710, exemplified by the loading conditions, or 70% and 80% thresholds 335 and 337, illustrated in FIG. 3A, to determine whether or not the existing condition is equal to (or greater than) the predetermined condition at step 720. If the conditions are equal, or the existing condition is greater than the predetermined condition, as determined at step 730, the predetermined usage time of the switching exchange timer will be reduced at step 740. Once the predetermined usage time is reduced, it will normally not be reset until the existing condition falls back below the level of the predetermined condition, as shown by repeated testing at step 770. If equivalence is not determined at step 750, or if the existing condition is less than the predetermined condition, then the predetermined usage time of the timer is reset (if necessary) at step 755, and sensing at step 700 and comparing at step 710 are repeated, until equivalence (or excess) is determined at step 720.

The timer is only reset if the original time-out period has been reduced, otherwise resetting the timer is not necessary. For example, assume an exchange timer is operating in the original, reset, condition. The steps 700, 710, 720, 750, and 755 (no reset necessary) will be navigated as a loop until the predetermined condition is met or exceeded, and then step 740 will be executed to reduce the timer time-out period. The basic loop at 700 will again be entered and executed. If the condition is still exceeded, step 740 will again be executed (although not needed), which leaves the time-out period at the same, already-reduced value, and the loop is entered again. If the predetermined condition threshold is no longer exceeded, then step 755 is encountered, and the time-out value for the timer is reset, and the loop at 700 is re-entered.

This method may also be implemented between exchanges within a telecommunications system, so as to comprise the additional step of communicating from a second exchange to a first exchange when an existing condition within the second exchange is sensed at step 700, compared with a predetermined condition in the second exchange at step 710, and, upon a determination of equality at step 720, the second exchange can optionally, at step 770, send a signal to a first exchange by way of a communications link between the first and second exchanges at step 780, so as to cause a reduction in the predetermined usage time of a timer within the first exchange at step 740. Such communication can occur both forward along the communication path between a series of exchanges within a telecommunications system, and backward through the path, as described previously. Further process steps, such as continued sensing of existing conditions, comparisons of existing conditions with predetermined conditions, and reducing or increasing predetermined usage times may occur after step 740, i.e. at step 760, if desired.

Although the invention has been described with reference to specific embodiments, this description is not meant to be construed in a limited sense. The various modifications of the disclosed embodiments, as well as alternative embodiments of the invention will become apparent to persons skilled in the art upon reference to the description of the invention. It is, therefore, contemplated that the appended claims will cover such modifications that fall within the scope of the invention, or their equivalents.

What I claim is:

1. An apparatus for reducing loading of a switching exchange comprising:
   a timer for measuring a predetermined usage time for a switching exchange resource, wherein the timer is selected from the group consisting of a dial tone timer, a dialing timer, a ring timer, a busy timer, a connection timer, and an event timer; and
   a timer reduction unit in electronic communication with the timer, wherein the timer reduction unit reduces the measured predetermined usage time responsive to detecting a predetermined condition.

2. The apparatus of claim 1, wherein the predetermined condition is a loading condition in excess of a predetermined threshold.

3. The apparatus of claim 2, wherein the loading condition is a number of calls.

4. The apparatus of claim 2, wherein the loading condition is a number of calls occurring within a predetermined amount of time.

5. The apparatus of claim 2, wherein the loading condition is a number of occupied ports.

6. The apparatus of claim 2, wherein the loading condition is a number of occupied switch resources.

7. The apparatus of claim 1, further comprising a load detection unit which communicates with the timer reduction unit in response to detecting said predetermined condition.

8. The apparatus of claim 1, wherein the predetermined usage time is reduced by a predetermined amount of time.

9. The apparatus of claim 1, wherein the predetermined condition is a timing condition.

10. The apparatus of claim 9, wherein the timing condition is a time of day.

11. The apparatus of claim 9, wherein the timing condition is a date.

12. An apparatus for reducing loading of a private branch exchange (PBX) comprising:

a timer for measuring a predetermined usage time for a PBX resource, wherein the timer is selected from the group consisting of a dial tone timer, a dialing timer, a ring timer, a busy timer, a connection timer, and an event timer; and a timer reduction unit in electronic communication with the timer, wherein the timer reduction unit reduces the measured predetermined usage time responsive to detecting a predetermined condition.

13. The apparatus of claim 12, wherein the predetermined condition is a loading condition in excess of a predetermined threshold.

14. The apparatus of claim 13, wherein the loading condition is a number of calls.

15. The apparatus of claim 13, wherein the predetermined condition is a timing condition.

16. The apparatus of claim 15, wherein the timing condition is a time of day.

17. A telecommunications system comprising:

a first switching exchange including a timer for measuring a predetermined usage time for a switching exchange resource and a timer reduction unit, wherein the timer is selected from the group consisting of a dial tone timer, a dialing timer, a ring timer, a busy timer, a connection timer, and an event timer;

a second switching exchange; and a communications link connected to the first and second switching exchanges, whereby the second switching exchange sends a signal to the first switching exchange in response to detecting a predetermined condition, and the timer reduction unit of the first switching exchange reduces the measured timer predetermined usage time by a predetermined amount of time.

18. The telecommunications system of claim 17, wherein the electronic communications link uses signaling system seven protocol.

19. The telecommunications system of claim 17, wherein the predetermined condition is a loading condition.

20. The telecommunications system of claim 19, wherein the loading condition is a number of calls.

21. The telecommunications system of claim 17, wherein the predetermined condition is a timing condition.

22. The telecommunications system of claim 21, wherein the timing condition is a time of day.

* * * * *